United States Patent
Holleczek et al.

(10) Patent No.: US 11,802,941 B2
(45) Date of Patent: Oct. 31, 2023

(54) SENSOR APPARATUS FOR DETECTING AN OBJECT

(71) Applicant: Robert Bosch GmbH, Stuttgart (DE)

(72) Inventors: Annemarie Holleczek, Stuttgart (DE); Mustafa Kamil, Ludwigsburg (DE); Stefan Spiessberger, Weinstadt (DE); Tobias Peterseim, Boeblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 661 days.

(21) Appl. No.: 16/637,048

(22) PCT Filed: Jul. 27, 2018

(86) PCT No.: PCT/EP2018/070379
§ 371 (c)(1),
(2) Date: Apr. 1, 2020

(87) PCT Pub. No.: WO2019/030015
PCT Pub. Date: Feb. 14, 2019

(65) Prior Publication Data
US 2020/0386863 A1 Dec. 10, 2020

(30) Foreign Application Priority Data

Aug. 8, 2017 (DE) .................. 10 2017 213 726.6

(51) Int. Cl.
*G01S 7/481* (2006.01)
*G02B 3/06* (2006.01)
*G01S 17/04* (2020.01)

(52) U.S. Cl.
CPC ............ *G01S 7/4812* (2013.01); *G01S 7/481* (2013.01); *G01S 17/04* (2020.01); *G02B 3/06* (2013.01)

(58) Field of Classification Search
CPC ........ G01S 7/4812; G01S 17/04; G01S 7/481; G02B 3/06
See application file for complete search history.

(56) References Cited

U.S. PATENT DOCUMENTS 3,825,747 A * 7/1974 Thomson .............. G01S 7/4812
250/216
4,063,226 A * 12/1977 Kozma ................ G03H 1/0486
365/216
(Continued)

FOREIGN PATENT DOCUMENTS

CN 1042119 A 5/1990
CN 102549380 A 7/2012
(Continued)

OTHER PUBLICATIONS

"High resolution imaging with TM01 laser beams", Proc. of SPIE vol. 7099, 709901 (2008) by Dehez et al.*
International Search Report dated Oct. 12, 2018 for corresponding International Application PCT/EP2018/070379, filed Jul. 27, 2018. XP001237587.
(Continued)

*Primary Examiner* — Jamil Ahmed
(74) *Attorney, Agent, or Firm* — NORTON ROSE FULBRIGHT US LLP; Gerard Messina (57) ABSTRACT

A sensor device for detecting an object with the aid of light of at least one wavelength, including a transmitting unit for emitting light using at least one light source and a receiving unit for receiving light, the light emitted by the transmitting unit in the plane perpendicular to the transmit path having the form of a circumferential surface, which includes an inner area to which light is not applied, an optical element being situated in a shared part of the transmit and receive paths, in such a way that the cross-section surface of the optical element in the plane perpendicular to the transmit path essentially completely overlaps with its cross-section surface the inner area to which light is not applied.

14 Claims, 6 Drawing Sheets

(56) References Cited

U.S. PATENT DOCUMENTS

| | | | |
|---|---|---|---|
| 5,642,209 A * | 6/1997 | Baker | G03H 1/02 |
| | | | 430/5 |
| 7,894,044 B1 | 2/2011 | Sullivan | |
| 8,836,922 B1 | 9/2014 | Pennecot et al. | |
| 2004/0095573 A1 | 5/2004 | Tsai et al. | |
| 2011/0293215 A1 | 12/2011 | Ruggiero et al. | |
| 2013/0135585 A1 | 5/2013 | Heiberger et al. | |
| 2014/0340669 A1 | 11/2014 | Dobschal et al. | |
| 2015/0234195 A1 | 8/2015 | Honea et al. | |

FOREIGN PATENT DOCUMENTS

| | | | |
|---|---|---|---|
| CN | 106066294 A | 11/2016 | |
| EP | 2381268 | 10/2011 | |
| EP | 2482094 | 8/2012 | |
| JP | 2003249112 A * | 9/2003 | H01L 33/30 |

OTHER PUBLICATIONS

Shiina, T. et al. "In-Line Type Micropulse Lidar with an Annular Beam: Experiement," Applied Optics, Optical Society of America, Washington DC, US, vol. 44, No. 34, Dec. 1, 2005, pp. 7407-7413.

Dehez, H. et al. "High Resolution Imaging with TM01 Laser Beams." SPIE, PO Box 10 Bellingham, WA, 98227-0010, USA, Aug. 4, 2009. XP040443017.

Lu, B et al. "Beam combination of a radial laser array: Hermite-Gaussian model" Optics Communicat, Elsevier, Amsterdam, NL, vol. 178, No. 4-6, May 1, 2000, pp. 395-403. XP004204288.

Marrucci, L. et al. "Optical Spin-to-Orbital Angular Momentum Conversion in Inhomogeneous Anisotropic Media," in Physical review Letters, 96, Apr. 28, 2006, 163905, pp. 1-15.

Nugrowati, A.M. et al. "Non-integer OAM beam shifts of Hermite-Laguerre-Gaussian beams," 1303 4925V3, Jul. 24, 2013, Arixiv.org, pp. 1-10.

* cited by examiner

SENSOR APPARATUS FOR DETECTING AN OBJECT

FIELD OF THE INVENTION

The present invention relates to a sensor device for detecting an object with the aid of light of at least one wavelength, including a transmitting unit for emitting light using at least one light source and a receiving unit for receiving light.

The present invention also relates to a method for detecting an object with the aid of light of at least one wavelength, light being emitted with the aid of a transmitting unit using at least one light source and light being received with the aid of a receiving unit.

The present invention furthermore relates to a method for generating light.

Although the present invention is applicable to arbitrary sensor devices, the present invention will be explained with reference to LIDAR sensor devices.

BACKGROUND INFORMATION

Various LIDAR sensor devices may include a transmitting and receiving unit for laser light. The transmitting unit emits continuous (continuous wave) or pulsed, for example, infrared laser light, in the transmit direction. If this light is incident on a movable or fixed obstacle, for example, a moving or stationary automobile, pedestrian, or the like, it is partially reflected back in the direction of the receiving unit. If one evaluates the time difference of transmit and receive points in time in a detector, the so-called TOF (time-of-flight), the path covered by the photons may be inferred via the propagation time and finally a distance to an object may be determined.

In coaxial LIDAR systems, such as from U.S. Pat. No. 8,836,922 B1, for example, a perforated mirror is used for the optical isolation of transmit and receive paths. An emitted light beam is transmitted through an opening of a perforated mirror to keep the losses upon receiving the light small. The cross section of the light beam may be small. To achieve this, the transmitted light beam is focused on the opening. A lens is used to subsequently collimate the light beam. After reflection of the light beam on an object and the back scattering, the light beam is imaged by the lens again on a detector. If the light beam leaves the LIDAR sensor in expanded form, which may be implemented via a large lens, the transmitted light beam may not be expanded up to the maximum lens diameter and collimated at the same time, which would be desirable for eye safety.

A device for optical distance measurement in geodetic and industrial surveying is discussed in DE 198 40 049 A1. It includes a transmitter unit having one or two optical radiation sources, which emit a diffraction-limited, visible radiation and a divergent visible or infrared radiation. The radiation of both radiation sources is guided through a shared objective and directed on a target object. The radiation reflected or scattered by the target object is received by the same objective. A coupling element in the form of a mirror having a hole reflects the divergent radiation beam, while the diffraction-limited visible radiation beam is guided through the hole.

In one specific embodiment, the present invention provides a sensor device for detecting an object with the aid of light of at least one wavelength, including a transmitting unit for emitting light using at least one light source and a receiving unit for receiving light, the light emitted by the transmitting unit in the plane perpendicular to the transmit path having the form of a surface, which includes an inner area to which light is not applied, an optical element being situated in a shared part of the transmit and receive paths, in such a way that the cross-section surface of the optical element in the plane perpendicular to the transmit path essentially completely overlaps with its cross-section surface the inner area to which light is not applied.

The term "overlap" with reference to two surfaces is to be understood in particular to mean that a first smaller surface is or forms a partial surface of a larger second surface: the first surface overlaps the second surface completely. The two surfaces may differ significantly in their size. In particular, the term "overlap" with reference to two surfaces is not to be understood as an identical size of two surfaces.

In another specific embodiment, the present invention provides a method for detecting an object with the aid of light of at least one wavelength, light being emitted with the aid of a transmitting unit using at least one light source and light being received with aid of a receiving unit, the light emitted by the at least one light source in the plane perpendicular to the transmit path forming a circumferential surface, which includes an inner area to which light is not applied, an optical element being situated in a shared part of the transmit and receive paths in such a way that the cross-section surface of the optical element in the plane perpendicular to the transmit path essentially completely overlaps with its cross-section surface the inner area to which light is not applied.

In one further specific embodiment, the present invention provides a method for generating light having an annular-shaped or elliptical ring-shaped cross-section surface, two different Hermite-Gaussian modes or two different transverse electromagnetic modes of the light of the light source, which may be in the form of a laser, being superimposed.

One of the advantages thus achieved is that the eye safety is significantly enhanced, in particular in the range of the so-called critical distance, since a total power of the emitted light cannot be incident, at any time, for example, in particular on a retina of an eye. Another advantage is that an improved ratio is thus achieved between the effective surface for emission and the effective surface for detection. In addition, it is advantageous that fewer aberrations occur, since fringe errors may be avoided and therefore improved imaging is possible. Another advantage is that the installation space may be reduced overall, since a small imaging optical unit in the receive path is enabled, this unit being able to include only a "detection part."

Further features, advantages and further specific embodiments of the present invention are described hereafter or are thus made obvious.

According to one advantageous refinement, the optical element is a deflection element, in particular a mirror. Transmit and receive paths may thus be separated from one another, for example, in a simple manner.

According to one further advantageous refinement, the surface is formed essentially annular-ring shaped or elliptical ring-shaped. One of the possible advantages is that, on the one hand, the eye safety is enhanced, on the other hand, the flexibility is increased since, for example, a column illumination may be implemented with the aid of an elliptical ring-shaped surface.

According to one further advantageous refinement, the surface is formed to be essentially quadrangular, hexagonal, or octagonal, in particular the number of the light sources being less than or equal to the number of the corners. One of the possible advantages is that the eye safety is thus further enhanced, as well as an increased flexibility in the illumination of an object, since various shapes or contours of the surface are possible here. If the number of the light sources is equal to the number of the corners, a simple generation of the entire corner structure of the surface is possible, since, for example, one light source having a corresponding column illumination may be used for each connection between two corners in the form of a rectangular surface. Of course, the number of corners is not restricted, but rather only 3 corners or also 5, 10, 12, or more corners are also possible.

According to one further advantageous refinement, a shape of an outer contour of the inner area and/or a shape of an outer contour of the cross-section surface essentially correspond to the shape of the outer contour of the circumferential surface. A coaxial and efficient arrangement of transmitted light beam and received light beam, therefore a coaxial system, may be provided in a particularly simple manner.

According to one further advantageous refinement, an optical expansion unit and/or a beamforming element are arranged in the transmit path. One of the advantages thus achieved is that the beam originally emitted by the light source may be adapted in a simple and flexible manner to various application conditions.

According to one further advantageous refinement, a second optical element is situated for light of the transmit path and includes a mount for the optical element for light of the receive path. An optical element for light of the receive path is, for example, a beam deflection element, for example, a mirror or the like. One of the advantages thus achieved is that elements of a combined transmit and receive aperture may thus be provided including compact installation space.

According to one further advantageous refinement, the mount is essentially hollow. The term "essentially" with respect to the term "hollow" means in particular that only a support structure, for example, a lattice or the like, is situated for the optical element. One of the advantages thus achieved is that weight is saved with sufficient stability of the mount at the same time. The mount may be manufactured, for example, from metal and/or plastic.

According to one further advantageous refinement, the transmitting unit includes a spatial mode converter for generating the shape of the light in the plane perpendicular to the transmit path. The shape of the light in the plane perpendicular to the transmit path may thus be adapted to various conditions in a simple and simultaneously flexible manner.

According to one further advantageous refinement, the spatial mode converter includes at least
 an axicon,
 a liquid crystal,
 a resonator structure,
 a Mach-Zehnder interferometer,
 a combination of one or multiple waveplates and an interferometer,
 a holographic element,
 a birefringent element,
or an arbitrary combination thereof. One of the advantages thus achieved is that various mode converters may thus be provided, which may be used appropriately depending on the requirement. A liquid crystal has the advantage that the incident mode may be adapted flexibly in its shape during its operating duration. One advantage of a resonator structure is in turn that a Laguerre-Gaussian-10 mode or a Laguerre-Gaussian-01 mode may be generated particularly simply.

One advantage of a Mach-Zehnder interferometer is in turn that a particularly simple and efficient superposition of Hermite-Gaussian-10 mode and Hermite-Gaussian -01 mode to form an annular light beam is enabled with the aid thereof. Generating an annular light beam with the aid of a holographic element is possible particularly cost-effectively with a small installation space requirement. A combination of one or multiple waveplates and an interferometer offers a particularly flexible and simultaneously efficient possibility for generating an annular light beam, in particular using various polarizations. Passive elements for the mode converter, for example, an axicon or the like, additionally have the advantage that they are robust with respect to environmental influences.

Further important features and advantages of the present invention result from the further descriptions herein, the drawings, and the associated description of the figures on the basis of the drawings.

It is obvious that the above-mentioned features and the features to be explained hereafter are usable not only in the particular specified combination but rather also in other combinations or alone, without departing from the scope of the present invention.

Specific embodiments of the present invention are illustrated in the drawings and will be explained in greater detail in the following description, identical reference numerals referring to identical or similar or functionally identical components or elements.

In the top view perpendicular to the viewing direction of transmit and receive paths.

DETAILED DESCRIPTION

Figure 1:
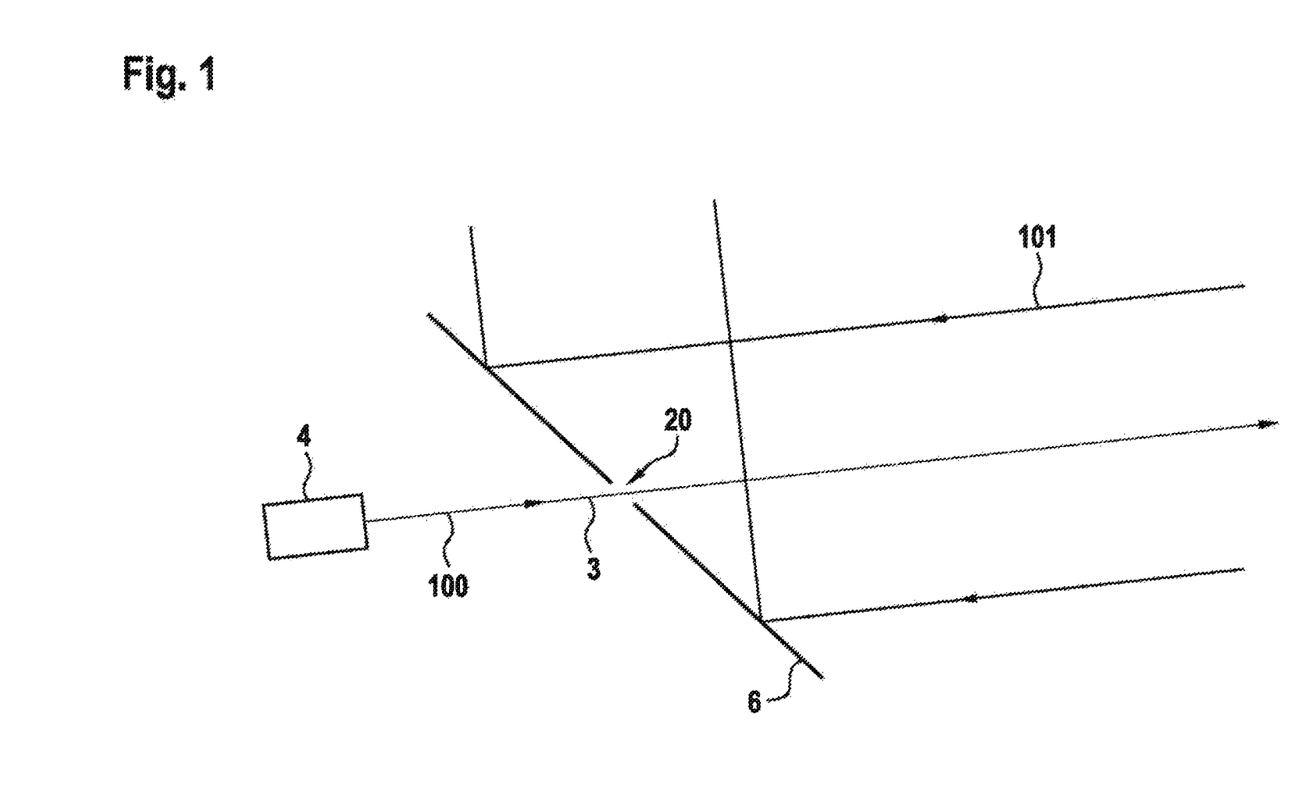
FIG. 1 schematically shows an already known sensor device.

FIG. 1 shows an already known sensor device.

A sensor device having a perforated mirror 6, which includes a central opening 20, is shown in FIG. 1. A laser beam 4 emits light 3 along transmit path 100 through hole 20 of perforated mirror 6. Light reflected from an object along receive path 101 is "collected" via mirror 6 and redirected, for example, onto a detector, deflected by 90° here.

Figure 2A:
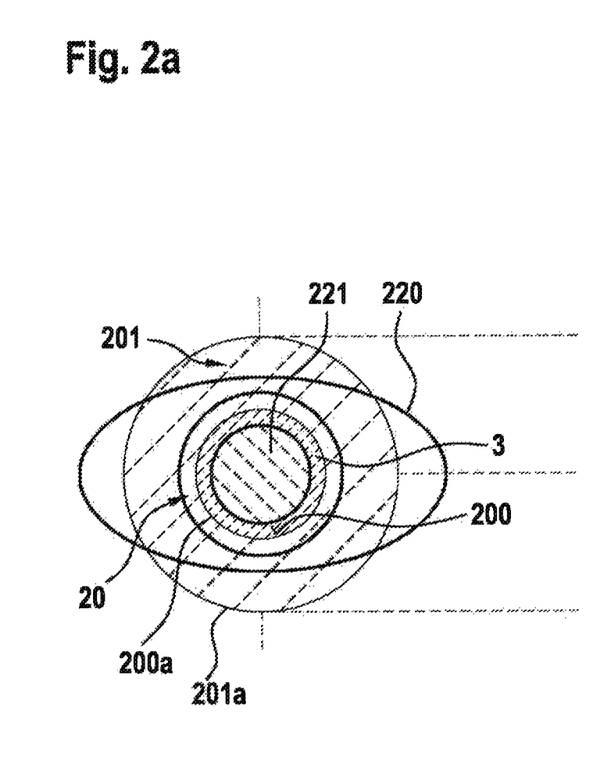
FIG. 2a schematically shows an already known emission and detection surface.
Figure 2B:
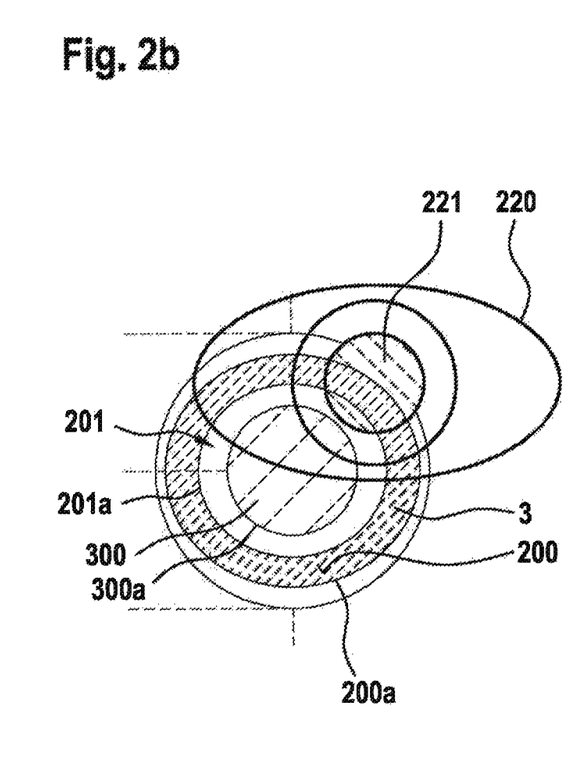
FIG. 2b schematically shows an emission and detection surface according to a first specific embodiment of the present invention.

FIG. 2a shows a known arrangement of emission and detection surface and FIG. 2b shows an emission and detection surface according to a first specific embodiment of the present invention.

A part of a coaxial LIDAR system including a laser 4 and a perforated mirror 6 is shown in FIG. 2a. The viewing direction corresponds here to the direction of perforated mirror 6 in parallel to receive path 101 of FIG. 1. Light 3 of a laser 4 along transmit path 100 passes through hole 20, this hole thus acts as an emission surface 200 from which light is emitted to detect objects. Perforated mirror 6 enclosing hole 20 collects the light reflected by an object in receive path 101. The surface of perforated mirror 6 acts as or represents a detection surface 300, using which light is "collected" for detection. Detection surface 300 corresponds to an area 201 to which light is not applied in transmit path 100. Area 201 including outer contour is not identified by reference numerals in FIG. 2a for the sake of clarity.

In FIG. 2b, the principle of emission and detection surface shown in FIG. 2a is essentially inverted, i.e., in FIG. 2b, emission surface 200 is situated annularly around circular detection surface 300. In contrast thereto, emission surface 200 according to FIG. 2a is situated essentially "inside" detection surface 300.

Circular detection surface 300 is situated coaxially inside area 201 enclosed by emission surface 200 according to FIG. 2b. The shape of outer contour 200a of emission surface 200 corresponds to the shape of outer contour 201a of inner area 201 and also to the shape of outer contour 301a of detection surface 300.

Light may be applied to the entirety of an eye 220, more specifically its pupil 221, in the case of the arrangement of emission surface 200 and detection surface 300 according to FIG. 2a. In FIG. 2b, however, application to entire pupil 221 of eye 220 is not possible as a result of the annular structure of emission surface 200 and thus the shape of the emission light beam. One of the possible advantages of the specific embodiment of FIG. 2b is that the circular structure thus generated may correspond to a Laguerre-Gaussian 10-LG10-mode. This LG10 mode is expanded so far upon its emission that the light of the entire mode is never completely applied to pupil 221 of eye 220. Laguerre-Gaussian 10 mode LG10 is also referred to as a doughnut mode. The annular emitted light is ideally at least as large in the "critical distance" as the pupil of an assumed or defined standard eye, so that the full power of the emitted light cannot be incident on the retina of eye 220 at any time.

Figure 3A:
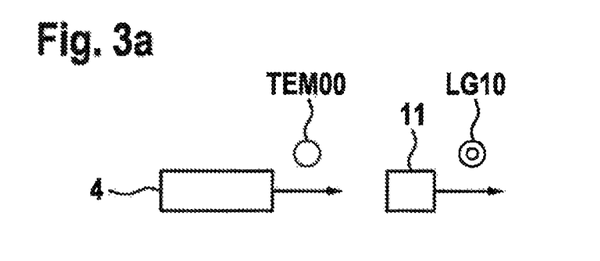
FIG. 3 schematically shows steps for generating an annular-shaped surface for emitted light according to a second specific embodiment of the present invention.
Figure 3B:
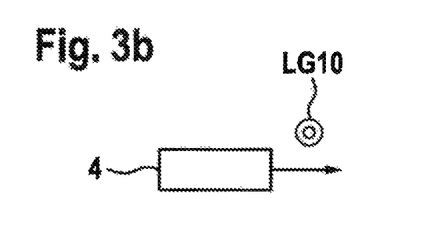
Figure 3C:
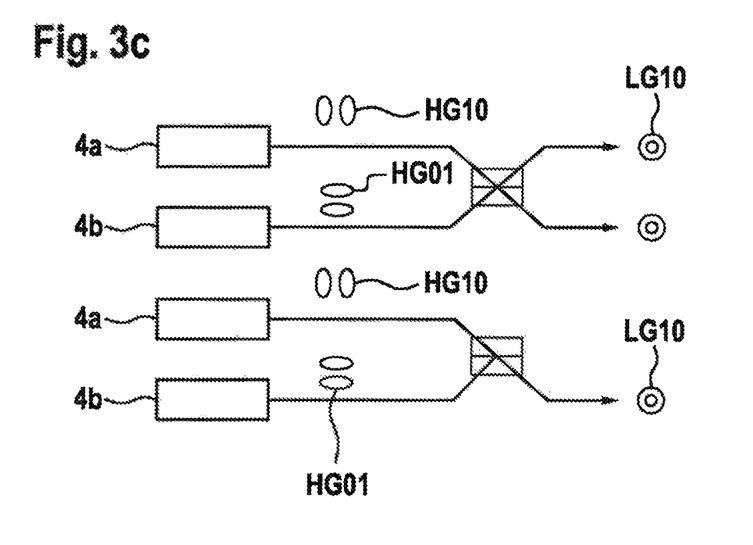

FIGS. 3a through 3c show steps for generating a doughnut-shaped surface for emitted light according to one specific embodiment of the present invention.

Various variants for generating a Laguerre-Gaussian 10 beam/mode are shown in FIGS. 3a through 3c. A first option according to FIG. 3a is a transverse electromagnetic mode (TEM 00 mode), which is converted in a mode converter 11 into a Laguerre-Gaussian 10 mode. A further option according to FIG. 3b is the use of a special laser 4, which already emits a Laguerre-Gaussian 10 mode at the output. A further option according to FIG. 3c is additionally to superimpose a Hermite-01 mode and a Hermite-10 mode generated using different light sources 4a, 4b with one another and thus to generate a Laguerre-Gaussian mode. The mode profile of the Laguerre-Gaussian 10 mode may thus be generated either directly from a Laguerre-Gaussian mode or a superposition of Hermite-Gaussian 01 mode and Hermite-Gaussian 10 mode.

A mode converter 11 may be formed by various elements, for example, by corresponding optical units such as an axicon, etc., by a liquid crystal, by a resonator structure, with the aid of a Mach-Zehnder interferometer, using a combination of waveplates and a nonfocal Fabry-Perot resonator, or holographic or birefringent elements or the like or an arbitrary combination thereof.

Figure 4:
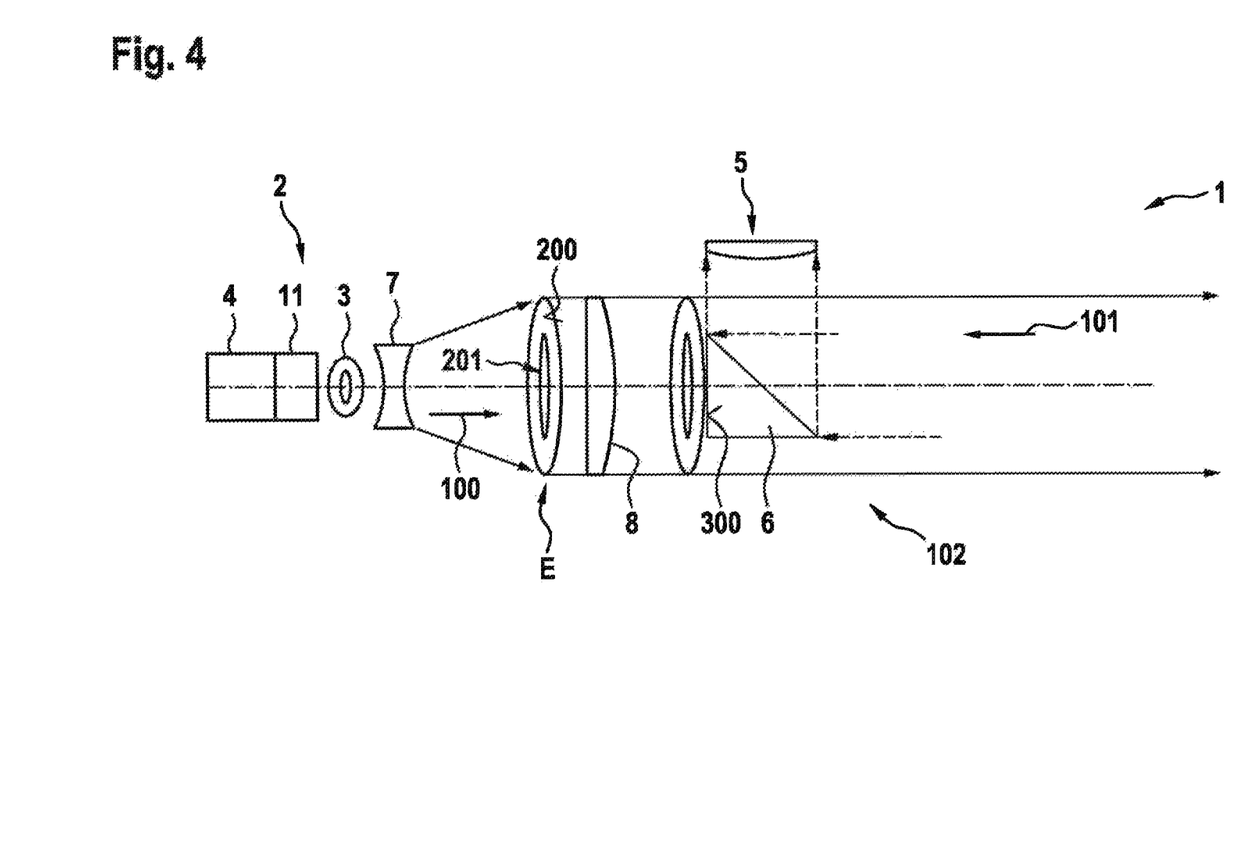
FIG. 4 schematically shows a sensor device according to a third specific embodiment of the present invention.

FIG. 4 shows a sensor device according to a fourth specific embodiment of the present invention.

A sensor device 1 is shown in FIG. 4. Sensor device 1 includes a laser 4, which emits light, and a mode converter 11, which generates a doughnut mode in the present case. After expansion by an expansion optical unit 7 and beamforming by a beamforming lens 8, this mode is used for a point illumination. A mirror 6 is situated inside shared part 102 of transmit path 100 and receive path 101, whose cross-section surface 300 in plane E corresponds to area 201 of the doughnut mode to which light is not applied. Furthermore, sensor device 1 includes a receiving optical unit 5. Mirror 6 deflects received light in receive path 101 by 90° out of the shared part of transmit and receive path 102 onto receiving optical unit 5. Expansion optical unit 7 and beamforming element 8 are optional: laser 4 or mode converter 11 may already provide a doughnut mode in the desired size.

Figure 5:
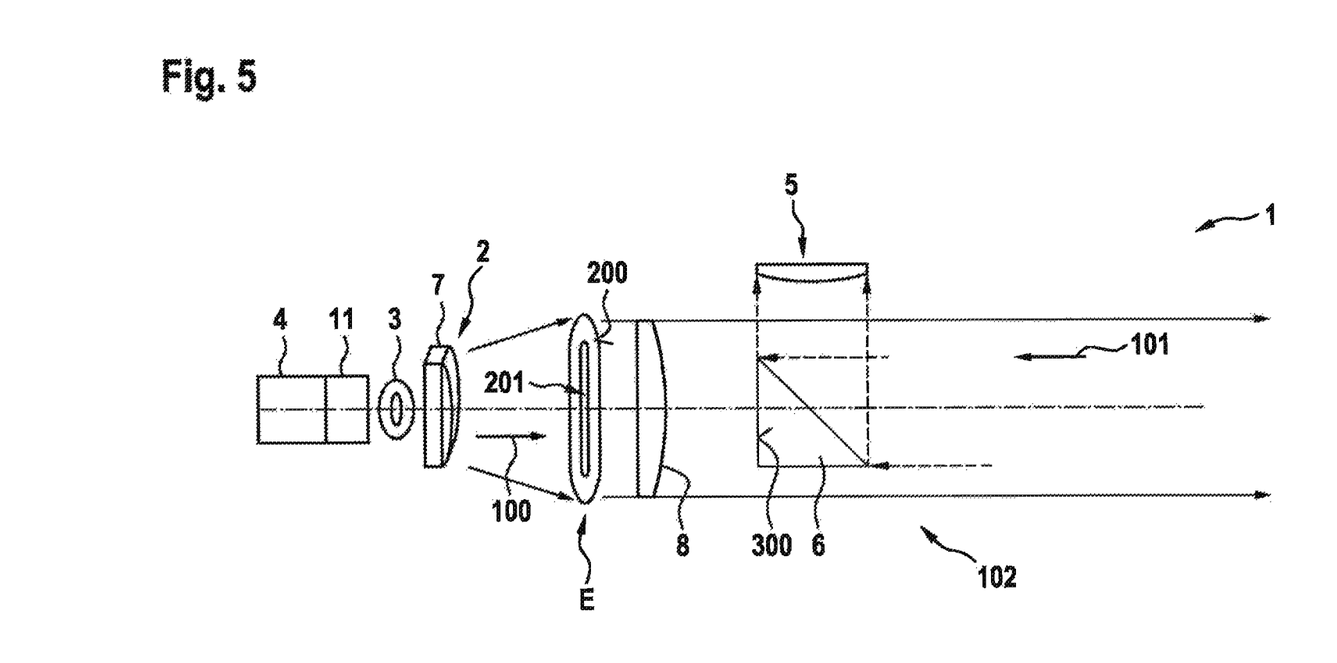
FIG. 5 schematically shows a sensor device according to a fourth specific embodiment of the present invention.

FIG. 5 shows a sensor device according to a fifth specific embodiment of the present invention.

FIG. 5 essentially shows a sensor device 1 according to FIG. 4. In contrast to transmitter device 1 according to FIG. 4, in sensor device 1 according to FIG. 5, expansion optical unit 7 is formed in such a way that the doughnut-shaped light beam generated in laser 4 and mode converter 11 is minimized with the aid of expansion optical unit 7 in a propagation direction and expanded perpendicularly thereto in a second direction, i.e., in plane E perpendicular to the propagation direction. In this way, an ellipsoidal doughnut results, which may also be used for a linear illumination. Transmitting unit 2 shown in FIG. 4, receiving unit 5, and possibly an imaging unit enable a deflection of the beam reflected by the object, receive path 101, onto a detector connected downstream from receiving optical unit 5.

Figure 6:
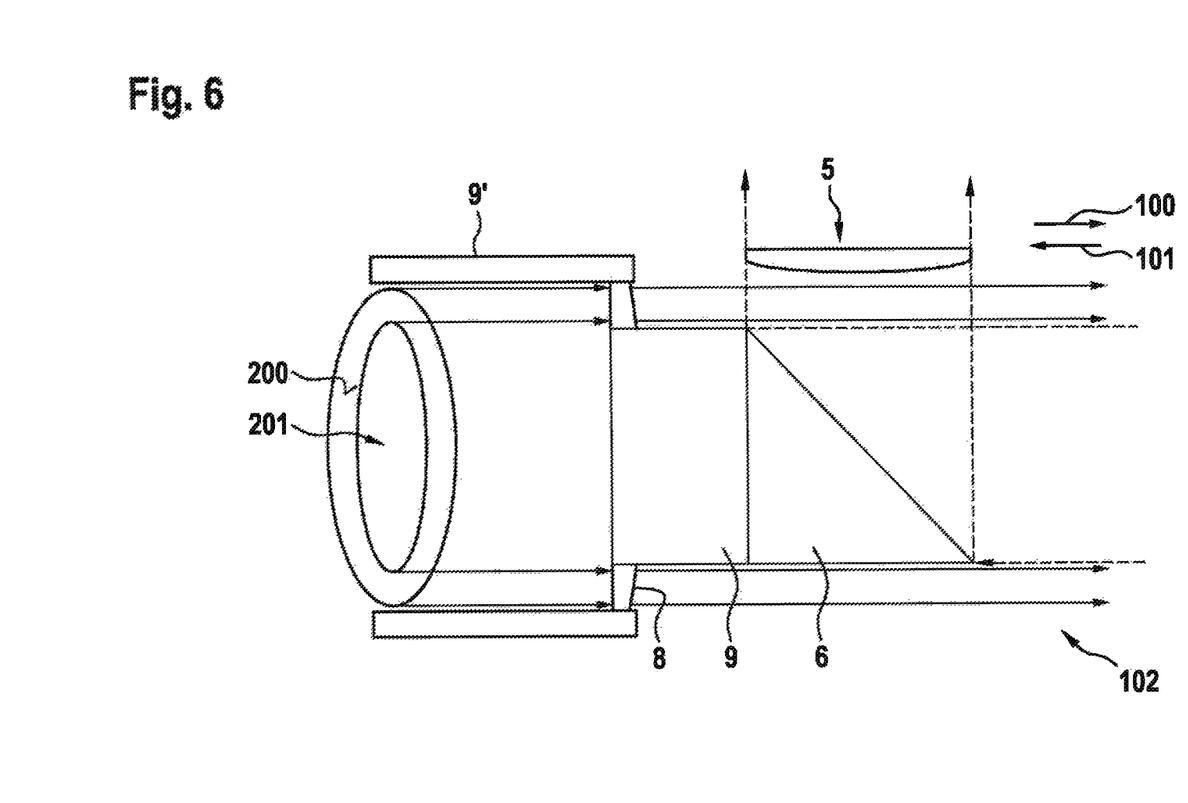
FIG. 6 schematically shows a sensor device according to a fifth specific embodiment of the present invention.

FIG. 6 shows a transmitter device according to a sixth specific embodiment of the present invention.

FIG. 6 essentially shows a detail of a sensor device 1. The fundamental structure of sensor device 1 according to FIG. 6 essentially corresponds to the structure of sensor device 1 according to FIG. 5. The beamforming element shown in FIG. 5 in the form of a beamforming line 8 is held in this case by an outer mount 9'. This mount has an internal diameter which is larger than the external diameter of the doughnut mode or circumferential surface 200. A mount 9 is situated in lens 8. This mount may be formed to be solid or partially hollow and supports deflection mirror 6. Mount 9 is situated in such a way that area 201 to which light is not applied essentially corresponds to the cross section of mount 9. In other words, mount 9 is situated "inside" light ring 200 in area 201 thereof to which light is not applied.

In one further specific embodiment, the sensor device is used in a macroscanner, i.e., laser 4 and receiving unit 5 rotate together with SPAD detectors or APD detectors.

At least one of the specific embodiments of the present invention enables, provides, or includes at least the following:

improved distribution of emission surface in relation to detection surface enhanced eye safety reduced aberrations due to avoidance of fringe errors in the receiving optical unit, which enables better imaging smaller imaging options possible, since they only have to be able to reshape the detection part installation space minimization with enhancement of the eye safety at the same time.

Although the present invention was described on the basis of exemplary embodiments, it is not restricted thereto, but rather is modifiable in manifold ways.

What is claimed is:

1. A sensor device for detecting an object with light of at least one wavelength, comprising:
   a light source;
   a receiver; and
   a mirror;
   wherein:
   the light source is configured to emit light in a transmit path in a first direction;
   the sensor device is configured to form the emitted light into a shape so that, upstream from the mirror in the transmit path, in a plane perpendicular to the transmit path, the shape is of a surface that includes (a) a center inner area to which none of the emitted light is applied and (b) a surrounding area around the inner area that is lit with the emitted light, the emitted light having the shape thereby traveling downstream in the transmit path towards a location of the transmit path at which the mirror is located;
   an entirety of the mirror overlaps with the center inner area so that all coordinates of a direction perpendicular to the first direction populated by the mirror are also within the center inner area of the shape in the plane upstream from the mirror, the light of the surrounding area of the shape being transmittable around the mirror, to thereby be emitted out of the sensor device;
   the mirror is configured for light reflections, which enter the sensor device in a direction opposite to the first direction, to impinge upon the mirror and to be reflected by the mirror, towards the receiver, in a direction that is not parallel to the first direction.

2. The sensor device of claim 1, wherein the surface is formed to be annular-shaped or elliptical ring-shaped.

3. The sensor device of claim 1, wherein the surface is formed to be quadrangular, hexagonal, or octagonal with a number of corners connected by light edges, and wherein the light source is composed of a number of light sources that is equal to the number of the corners, with each of the number of light sources producing a respective one of the edges.

4. The sensor device of claim 1, wherein a shape of an outer contour of the center inner area essentially corresponds to a shape of an outer contour of the surrounding area of the shape.

5. The sensor device of claim 1, further comprising a first lens having a curvature by which an initial form of the emitted light present on the transmit path is expanded to into the shape, wherein the first lens is situated in the transmit path between the light source and the mirror.

6. The sensor device of claim 1, further comprising:
   a lens situated for light of the transmit path; and
   a mount for the lens, wherein the mount is essentially hollow.

7. The sensor device of claim 1, further comprising a spatial mode converter, wherein the spatial mode converter is configured to convert an original form of the emitted light of the light source into a different form having the shape.

8. The sensor device of claim 7, wherein the spatial mode converter includes: an axicon, a liquid crystal, a resonator structure, a Mach-Zehnder interferometer, a combination of one or multiple waveplates and an interferometer, a holographic element, a birefringent element, or an arbitrary combination thereof.

9. A method for detecting an object with light of at least one wavelength using a sensor device that includes a light source, a receiver, and a mirror, the method comprising:
   emitting the light, by the light source in a transmit path in a first direction;
   forming the emitted light into a shape so that, upstream from the mirror in the transmit path, in a plane perpendicular to the transmit path, the shape is of a surface that includes (a) a center inner area to which none of the emitted light is applied and (b) a surrounding area around the inner area that is lit with the emitted light, the emitted light having the shape thereby traveling downstream in the transmit path towards a location of the transmit path at which the mirror is located, wherein an entirety of the mirror overlaps with the center inner area so that all coordinates of a direction perpendicular to the first direction populated by the mirror are also within the center inner area of the shape in the plane upstream from the mirror, the light of the surrounding area of the shape being transmitted in the first direction around the mirror, to thereby be emitted out of the sensor device;
   receiving, by the sensor device, light reflections that enter the sensor device in a direction opposite to the first direction, the received light reflections impinging upon the mirror; and
   the reflecting, by the mirror, the light reflections impinging upon the mirror towards the receiver in a direction that is not parallel to the first direction.

10. The method of claim 9, wherein an annular-shaped or elliptical ring-shaped cross-section surface for light is generated, and wherein two different Hermite-Gaussian modes or two different transverse electromagnetic modes of the light, in the form of a laser, are superimposed.

11. The sensor device of claim 5, further comprising a second lens arranged in the transmit path between the first lens and the mirror, wherein the second lens is configured to perform beam forming.

12. The sensor device of claim 11, further comprising an outer mount and an inner mount, wherein the second lens is ring-shaped and is held by and radially between the outer mount and the inner mount.

13. The sensor device of claim 1, further comprising a lens arranged in the transmit path between the light source and the mirror, wherein the lens is configured to perform beam forming.

14. The sensor device of claim 13, further comprising an outer mount and an inner mount, wherein the lens is ring-shaped and is held by and radially between the outer mount and the inner mount.

* * * * *